Patented Oct. 20, 1936

2,057,672

UNITED STATES PATENT OFFICE 2,057,672

UREA PRODUCT

Carleton Ellis, Montclair, N. J., assignor to Ellis-Foster Company, a corporation of New Jersey No Drawing. Application September 3, 1924, Serial No. 735,600. Renewed April 13, 1929

17 Claims. (Cl. 106—22)

This invention relates to sheets or other articles of mica formed by cementing together flakes or particles of mica with the aid of a resinous product prepared from urea especially from urea and formaldehyde or from derivatives of urea such as thiourea and to the process of making same.

Various products of value are made by cementing together flakes or laminae of mica in the form commercially known as mica splittings using for the purpose an aqueous ammoniacal solution of shellac. Sheets may be built up in this manner which are used for insulation in the manufacture of motors and dynamos, in the electrical heating parts of laundry irons, for making lamp shades and the like. Shellac varies considerably in quality and in price and it is the object of the present invention to obtain a synthetic resin which may be prepared of fairly constant quality that will have satisfactory cementing or binding effect.

Not all synthetic resins can be used for the purpose for example the resinous phenol formaldehyde products do not have the property of adhering to mica or as it is sometimes stated do not "wet" this material.

The solid compounds obtained by the reaction of formaldehyde with urea have however the property of adhering to mica and I have found them adapted for the purpose of making sheets and other articles from mica splittings.

In case mica powder is used as a filling material plastic compositions are obtained which may be shaped by hot pressing to make molded articles.

Urea formaldehyde resin has the property of hardening or setting when heated and this reaction may be used to bring about a curing of the product in a hot press or in a baking oven or under exposure to heat in other ways.

As an example 30 parts by weight of urea are dissolved in 120 parts of aqueous 40 per cent formaldehyde and 3 parts of phthalic acid or phthalic anhydride are added. As the urea dissolves in the formaldehyde solution there is a decided lowering of temperature. Then the solution begins to show signs of turbidity which change is accompanied by a gradual rise in temperature. The reaction is exothermic. The solution finally becomes milky about the time the spontaneous temperature rise has reached its maximum. In one case the temperature went from 28 to 67° C. in about 20 minutes. The reaction mixture was allowed to stand for 1 hour during which time the temperature dropped to 42° C. Heat was applied and the temperature was raised over a period of one-half hour to 76° C. and then more gradually over a period of 2 hours to 94° C. After heating for about 45 minutes the mixture began to clear but a longer heating was required to completely clarify the solution. A syrupy solution was obtained having a specific gravity of 1.151 at 25° C. the solid content of which was 44 per cent.

Thin splittings of mica of about one inch in diameter were coated on one side with this solution and these were laid on a wire screen in such a manner that the edges overlapped to form a sheet. The sheet was dried for about 10 minutes at 80° C. and then coated on the other side and similarly dried. Two such sheets were placed together and on either side was placed an additional sheet which was coated on one side only, that side being the one in contact with the two inner sheets. The four sheets were amalgamated into a composite sheet in the hydraulic press under a pressure of 2000 pounds for 10 minutes at 120° C. A firm stiff well-bonded composite sheet made up of the cemented mica splittings was thus obtained. The sheet was light colored and translucent.

In another case the syrup was diluted with water to contain 5.5 per cent of the urea resin and sheets of mica were cemented in a similar manner.

In order to make a product which can be readily diluted with water it is best to carry out the reaction according to the above formula under a reflux condenser. A syrup is thus obtained which can be diluted with two to three times its volume of water without turbidity and beyond this dilution a small amount of alcohol will prevent turbidity. If however the reaction is carried out in an open vessel the addition of water in say equal volume may cause a heavy turbidity.

In like manner the syrup may be mixed with mica powder with which may be incorporated other fillers if desired. Most of the fillers employed in the plastic molding industry at the present time are suitable without specific enumeration. In some cases it is desirable to add other synthetic resins or natural resins, gums, asphalts, coloring matter, rubber and other materials which modify the properties of the product.

However I generally prefer the urea formaldehyde resin without other additions than mica as light colored products having a variety of uses are obtained when mica of the proper color is employed.

In place of urea, mixtures of the latter and thiourea and the like may be employed in some cases or even the thiourea by itself subjecting it to appropriate treatment with formaldehyde. In place of formaldehyde, paraform and other polymers of formaldehyde may be employed and in some cases hexamethylenetetramine by itself or in conjunction with formaldehyde. Furthermore the invention does not preclude the use of other aldehydes capable of yielding with urea substances having an adhesive or cementing property with respect to mica.

Preferably I employ an acid catalyst such as phthalic acid or other organic acid such as benzoic, chloracetic, oxalic acids and the like. It is also possible to use catalytic proportions of mineral acids such as hydrochloric acid in some cases.

In other cases an alkaline catalyst such as ammonia or caustic soda may be employed. Sometimes it is feasible in preparing the syrup to start the reaction with a small amount of an alkaline catalyst and then acidulate with acid catalyst such as phthalic acid.

The invention however contemplates the use of urea resin whether made in acid, alkaline or neutral solution. It also may include urea phenol formaldehyde resin prepared for example by reacting on urea and phenol with formaldehyde in the presence of phthalic acid or other catalyst. For adherence to mica however the use of phenol is not recommended, at least in any influential amount since it tends to diminish the cementing power.

It should be further emphasized that the foregoing illustration is of a very specific character furnishing detailed information but it should be understood that in submitting so specific an illustration I do not wish to restrict myself thereby as the ingredients and proportions and additions of extraneous substances are capable of considerable modification.

What I claim is:—

1. Mica flakes cemented together with urea resin.

2. Mica flakes cemented together with urea resin to form a composite sheet.

3. Mica material cemented together with urea formaldehyde resin.

4. Heat set mica material cemented together with a urea resin.

5. Heat set and molded mica material cemented together with a urea formaldehyde resin.

6. Mica material cemented together with urea resin and another resin.

7. Mica material cemented together with urea formaldehyde resin and another synthetic resin.

8. Mica material cemented together with urea formaldehyde resin and a property-modifying ingredient.

9. The process of making composite sheets or masses from mica which comprises coating the surfaces thereof with an aqueous solution of urea formaldehyde resin and amalgamating together the separate pieces of mica by hot pressing.

10. In the process of making composite sheets from mica splittings the step which comprises treating the splittings with a solution of the reaction products of urea, formaldehyde and an organic acid.

11. In the process of making composite sheets from mica splittings the step which comprises treating the splittings with a solution of the reaction products of urea, formaldehyde and phthalic acid.

12. A translucent laminated structure formed of transparent micaceous sheet material cemented together by urea resin.

13. A laminated structure formed of transparent micaceous sheet material cemented together by heat set urea-formaldehyde material.

14. Heat set mica material cemented together with a urea and thiourea resin.

15. A translucent molded product containing mica and urea resin.

16. A translucent molded product containing mica-like material and urea resin.

17. A heat set product containing mica-like material and resinous bodies made from urea and thiourea.

CARLETON ELLIS.